March 22, 1955 D. A. JENNY Re. 23,964

COLOR TELEVISION PICTURE TUBE

Original Filed June 27, 1950 2 Sheets-Sheet 1

INVENTOR
DIETRICH A. JENNY
BY
Rodrick Malcolm
ATTORNEY

March 22, 1955 D. A. JENNY Re. 23,964

COLOR TELEVISION PICTURE TUBE

Original Filed June 27, 1950 2 Sheets-Sheet 2

INVENTOR
DIETRICH A. JENNY
BY
Roderick Malcolm
ATTORNEY

United States Patent Office

Re. 23,964

Reissued Mar. 22, 1955

23,964

COLOR TELEVISION PICTURE TUBE

Dietrich A. Jenny, Princeton, N. J., assignor to Radio Corporation of America, a corporation of Delaware Original No. 2,611,099, dated September 16, 1952, Serial No. 170,573, June 27, 1950. Application for reissue September 9, 1954, Serial No. 455,098

9 Claims. (Cl. 313—77)

Matter enclosed in heavy brackets [ ] appears in the original patent but forms no part of this reissue specification; matter printed in italics indicates the additions made by reissue.

This application is for reissue of United States Patent 2,611,099 granted September 16, 1952 on original application for Letters Patent, Serial No. 170,573 filed June 27, 1950.

This invention is directed to improvements in cathode ray tubes for producing television pictures in full color.

Certain color television picture tubes employ directional-type fluorescent screens having picture elements which luminesce in different colored light depending upon the direction of approach of an electron beam. One specific type of directional screen comprises a great number of small tubular cells, each constituting a picture element. The cells have different ones of their interior walls coated with different fluorescent materials and are arranged as shown and described in the co-pending application to Alfred C. Schroeder, Serial No. 730,637, filed February 24, 1947 (now U. S. Patent 2,595,548), and in the co-pending application to R. R. Law, Serial No. 143,405, filed February 10, 1950. Another type of directional screen is that which appears herein as part of an illustrative embodiment of the present invention. This type of screen was disclosed in the co-pending application Serial No. 762,175, filed July 19, 1947, of Alfred N. Goldsmith. It comprises a full-color emissive target and an apertured masking electrode or "shadow plate." The target comprises many polychromatic picture elements, each consisting of a group of dot-like fluorescent coatings which luminesce in a different component color. One picture element group of the dot-like coatings underlies each small aperture of the masking electrode, and electrons must pass through this aperture in certain different predetermined directions to strike those coatings selectively.

Certain tubes having directional screens utilize a number of electron guns to provide separate beams which converge upon each picture element in different directions, e. g., which converge upon the open end of each tubular cell, or upon each aperture of the masking electrode in different directions. However, the present invention is directed to other tubes utilizing only one electron gun having a single beam which is so controlled that on a time-sharing basis its approach toward each part of the screen will be in the different required directions.

With a single gun, different convergent directions of approach to any part of the screen can be obtained by causing the mean directional axis of the beam electrons at its point of entry into the final focusing electron optic to be divergent from the axis of that optic in respectively corresponding directions. In the prior art, this has been accomplished by the use of a deflection field (electrostatic or electromagnetic) which is transverse to the initial mean axis of the electrons (their axis as they leave the gun) and rotates at a frequency equal to the rate of change of the color information divided by the number of color-components used. Actually, this kind of deflection, which results in continuously rotating or "nutating" the beam, causes its direction of convergence upon any part of the screen to be continually changing and therefore to be wrong for much of the time. Accordingly, it has been customary to completely block the flow of electrons during a large part of each rotation of the field. For example, in a three-color system, it has been customary to block it except for three intervals, 120 degrees apart, which are so short that the maximum difference between the directions of approach of the beam which can occur during each interval can be neglected, i. e., that any color mixing which may occur as a result of each such a difference is small enough to be tolerated.

As shown in the co-pending application Serial No. 165,552, filed June 1, 1950, of R. R. Law, the electron flow may be blocked either mechanically or electrically. It may be blocked mechanically by the use of a diaphragm, such as the diaphragm 42 shown in Fig. 1a of this co-pending application, which has a number of off-axis apertures with an angular separation, between adjacent apertures, of 360 degrees divided by the number of component colors used in the system. Or it may be blocked electrically by the application of appropriate voltage waves to the electron gun. However, in whatever way it may be blocked, the resulting loss of beam current reduces the picture brightness which can be attained by the tube. This is important since it is inherently difficult to produce bright pictures on most directional screens without this additional factor. For example, pictures produced by the cellular type of screen effectively lack [of] brightness because the light which is emitted from the internal walls of the cells is not produced directly toward the viewer. Or, in the case of the other type of directional screen mentioned above, much of the beam current is lost on the back surface of the masking electrode and therefore its energy is not usefully expended on the dot-like fluorescent coatings.

Accordingly, it is an object of the present invention to provide an improved, single-gun color television picture tube which is adapted to project beam electrons to any picture-element area of the screen in certain different convergent directions projecting it in said specific directions for intervals which added together equal substantially all of one period of the color switching frequency whereby it is unnecessary to block the beam for any substantial portion of said period to avoid color mixing.

This and other objects are attained according to the present invention by the use of a color switching beam deflection system having as many discrete deflection axes as the number of component colors for the system. For example, the deflection system which is suitable for a three-color system is of triangular symmetry. Such a deflection system is operated so as to cause the mean directional axis of the beam electrons to sequentially diverge from the axis of the final focusing electron optic in only as many different specific directions as the number of color components for the system, such as three, and to remain divergent in these specific directions for respective intervals whose total time duration is substantially equal to the full color period of one color switching cycle. More particularly, this deflection system causes the beam to diverge in the above-mentioned specific directions by deflecting it in abrupt, discontinuous steps rather than by continuously rotating (or "nutating") it as in the prior art. Because of this, the amount of color mixing is negligible and therefore it is either unnecessary to block the beam at all or to do so for any substantial time.

Figures 1, 2, 3, 4:
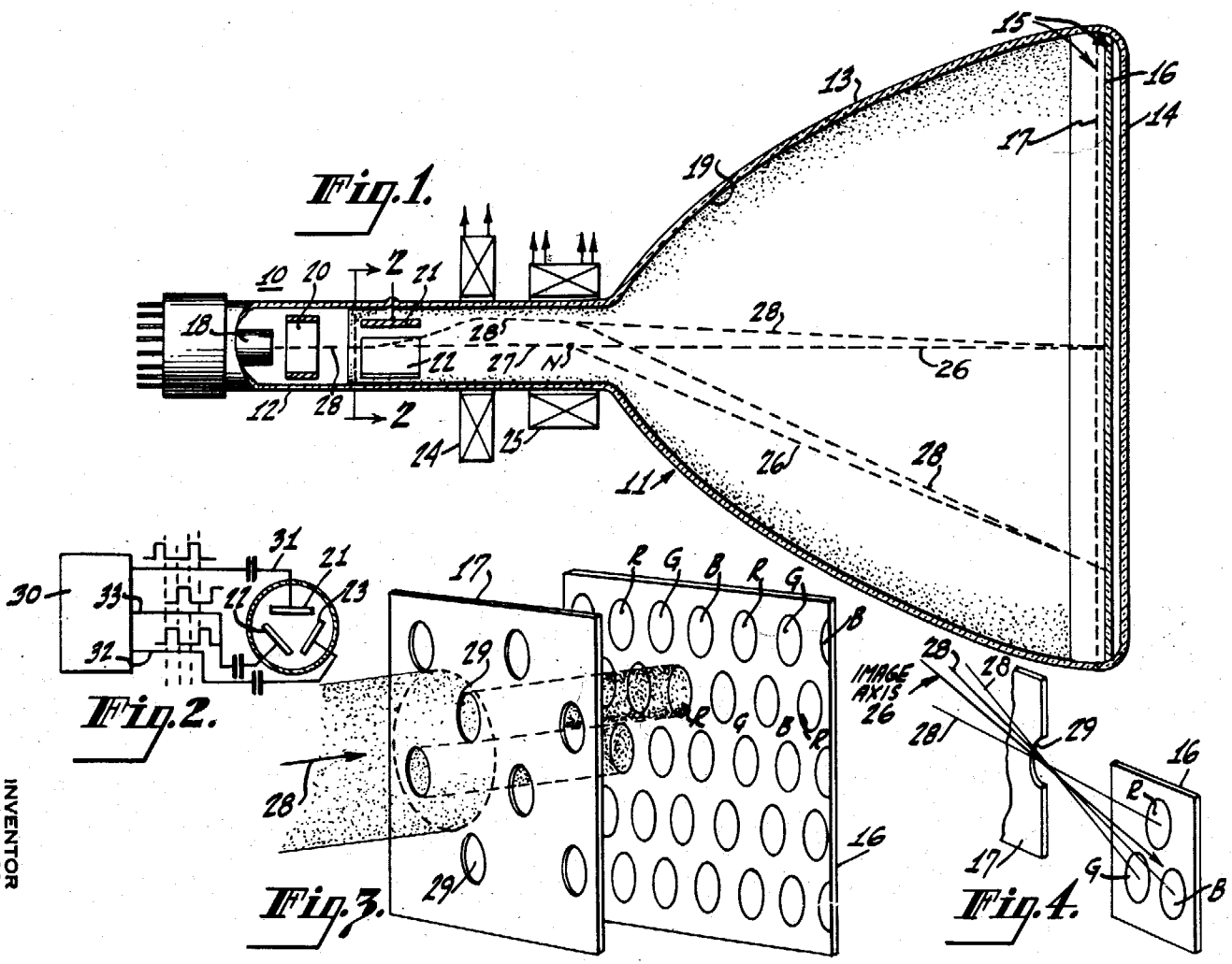
Fig. 1 represents a longitudinal sectional view of a tube embodying the present invention.
Fig. 2 is a transverse sectional view of the tube shown in Fig. 1, the view being taken in plane 2—2 through the neck of the tube.
Fig. 3 represents a greatly magnified view of a fragmentary portion of the directional screen represented in Fig. 1.
Fig. 4 illustrates how electrons passing through a given aperture in certain different directions strike different dot-like coatings selectively.

Fig. 1 shows a picture tube 10 comprising an evacuated envelope 11 having a neck 12 and a bulb 13, one wall of which is formed as a substantially flat window 14. Adjacent to the inside surface of the window 14 there is mounted, by means not shown, a directional screen assembly 15 comprising a translucent target plate 16 and an apertured masking electrode 17. The surface of the plate 16 which faces the electrode 17 carries many groups of dot-like fluorescent coatings R, G, B which luminesce in different colors. One group of the coatings R, G, B, underlies each small aperture 29 of the electrode 17 oriented as shown in Fig. 4. An electron gun 18 is mounted in the neck 12 to direct a stream of electrons toward the directional target 15. A conductive coating 19 is carried as shown on the inside of the bulb 13 and of a part of the neck 12 to form a final accelerating electrode. Between the electron gun 18 and the neck end of the conductive coating 19 there is a cylindrical focusing electrode 20. Three color switching deflection plates 21, 22, 23, each of which is positioned with its inside surface at an angle of sixty degrees with respect to that of each of the two others adjacent to it, are mounted within the rearmost part of the neck 12 into which the conductive coating 19 extends from the bulb 13. In the operation of the tube 10, the various electrodes (not shown) of the electron gun 18, the cylindrical electrode 20 and the conductive coating 19 are polarized at appropriate potentials for producing an electron cross-over point in the region between the color switching deflection plates 21, 22, 23. Beyond the positions of the color switching deflection plates 21—23, an electromagnetic focusing coil 24 is mounted externally of the neck 12. The field, or "final focusing electron optic," produced by this coil is adapted to focus beam electrons, which of course will diverge outward after passing the above-mentioned cross-over point, so as to direct them to a final cross-over point on or near to the masking electrode 17.

It will assist in the understanding of the present invention to bear in mind that the "beam" of electrons which impinges on the directional target 15 actually consists of a cone of convergent electrons having its apex at or near to the screen. Electrons entering the final focusing electron optic after passing their cross-over point within the plates 21, 22, 23, will have principal divergences due to their initial velocities and lesser divergences due to causes such as scattering and space charge effects. In any case, however much an electron may be divergent, or for whatever cause, the final optic will cause it to converge upon the final cross-over point provided, of course, the electron in question enters the aberration-free central portion of the optic.

A basic principle of the present invention, as well as of those disclosed in the above-mentioned co-pending applications Serial No. 730,637 (U. S. Patent 2,595,548), Serial No. 143,405, and Serial No. 762,175, and in other related co-pending applications including Serial No. 147,034 (U. S. Patent 2,581,487) and Serial No. 165,552, is that by purposely deflecting all of the beam electrons, so that their mean axis, 28, is divergent from the object axis 27 of the final focusing optic in a particular outward radial direction (as they enter this optic) one can cause the same electrons to converge upon its image axis in a corresponding inward radial direction. As will be explained in detail below, this is generally true even though it is most apparently so for the special condition in which there is zero scansion-deflection and therefore the image axis of the final focusing optic coincides with a forward extension of its object axis.

A deflection yoke 25, which may be of any suitable conventional type, is mounted on the neck 12 ahead of the focusing coil 24. Since at any instant its deflection field merges with that of the focusing coil 24, the resultant field of the two may be considered as a combined focusing-and-scanning electron optic. Except for brief instants during each field when the beam is either undeflected, i. e., when it is impinging on the very center of the screen 15, or when it is deflected in only one coordinate, this combined optic is analogous to a light optical system comprising in series a condensing lens, a first wedge-shaped prism with its long axis horizontally transverse to the axis of the condensing lens, and a second similar prism with its axis vertically transverse thereto. Dynamically the thickness of each prism varies cyclically between zero and some finite value.

Accordingly, one may think of the image axis 26 of the combined electron optic afforded by the focusing coil 24 and the yoke 25 as extending forward from the front end, N, of its object axis 27 in a constantly changing direction. This direction is a rectilinear extension of the object axis 27 for but one brief instant of each field and in a continually changing angular direction for the remainder thereof. As shown in Fig. 4, at any instant it is the radial direction of convergence of the mean axis 28 of the beam electrons toward the image axis 26 which determines what color light they will excite. As shown in Fig. 3, this is true even when the apertures 29 in the masking electrode 17 are so small and close together that the beam covers more than one of them at its point of impingement on this electrode.

In the operation of the tube 10, a color-switching voltage-wave source 30 (Fig. 2) has three individual outputs 31, 32, 33 respectively connected to the color switching deflection plates 21, 22, 23. This wave source 30 is adapted to provide over its respective outputs three separate trains of square waves. Each of these trains of waves has a repetition rate equal to the desired color switching frequency and the three of them have a three-phase mutual time relationship as shown in Fig. 2. The three plates 21—23 should all be polarized at a direct potential substantially equal to the velocity which has been attained by the beam electrons by the time they reach the region between these plates. Under such conditions, the effect which obtains each time that a square wave is applied to one of the color switching deflection plates is that the mean axis 28 of the beam electrons is abruptly diverted radially away from the axis 27 in a single specific direction toward the plate in question and remains so diverted for the duration of the square wave. Thus all of the time of each color switching cycle can be usefully employed in producing pure (unmixed) component colors.

Figure 6:
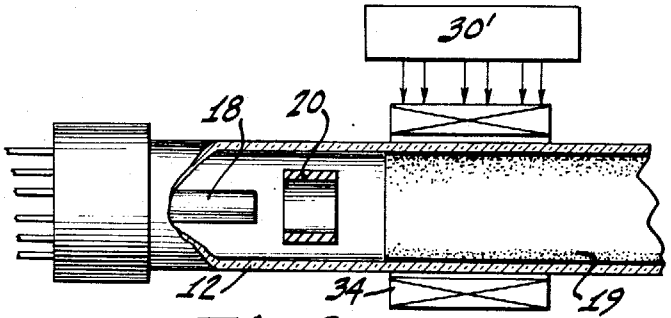
Fig. 6 is a longitudinal sectional view of a portion of an alternate embodiment of the present invention.

As shown in Fig. 6, the electrostatic color switching plates 21—23 can be replaced by a magnetic color switching yoke 34. This yoke comprises three coils (not shown) or three pairs of coils, each coil or pair of coils being wound and positioned, in accordance with well known art, to produce a magnetic field with its flux lines extending transversely to the object axis 27 at right angles thereto and to the flux lines of the magnetic field of the other two at angles of sixty (or 120) degrees thereto.

Where magnetic switching is used, a source 30' is employed to provide the coils, or pairs of coils, of the switching yoke 34 with three trains of current impulses of similar square-wave shape and three-phase mutual time relationship as the voltage waves provided by the source 30.

Figure 5:
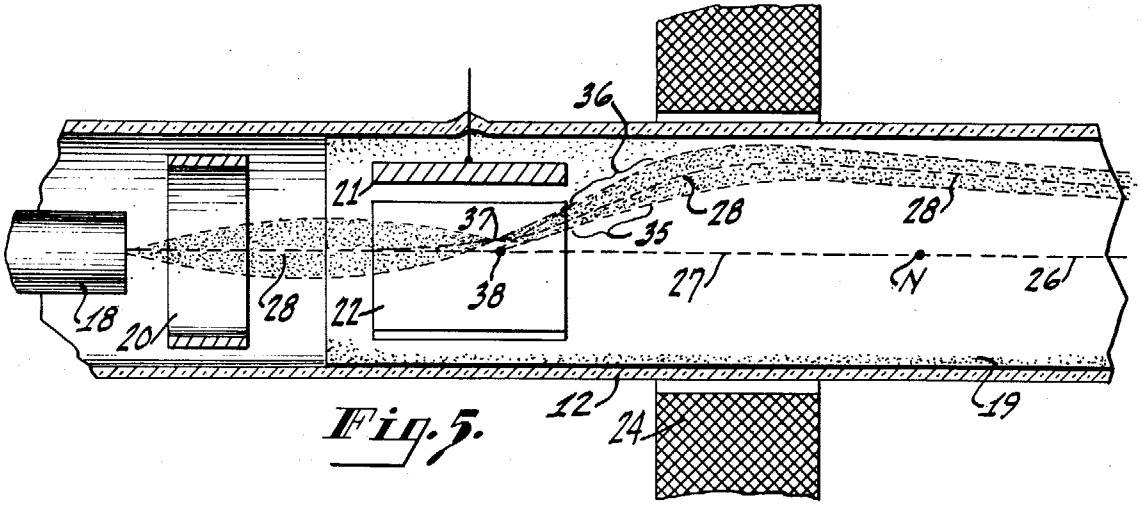
Fig. 5 is an enlargement of a portion of Fig. 1 and includes a representation of the paths of beam electrons in an initial portion of their journey from the gun to the directional screen.

Fig. 5 shows how beam electrons which are divergent after issuing from the electron gun 18 are directed to a cross-over point 37 within the space surrounded by the switching plates 21—23. It also shows that this cross-over point can be diverted radially from the axis 27. In particular, by way of example, it shows the cross-over point 37 to be diverted radially upward toward the color switching plate 21. The individual electrons follow paths which diverge from this cross-over. In addition, they continue to be diverted toward the plate 21, and therefore to follow curved paths, until they emerge from its deflecting field. When the electrons emerge from this deflection field they follow straight-line paths, such as the paths 35, 36, until they enter the condensing field of the focusing coil 24. The effect of the radially outward velocity components imparted to the electrons is to alter slightly the object length of the main focusing optic. In effect, this optic "sees" as its object a virtual cross-over point at a position where rearward extrapolations of the straight paths 35, 36 cross each other. If the triangular deflection system afforded by the plates 21—23 is physically symmetrical and if the polarizing direct potentials and the square wave switching voltages which are respectively applied to them are of the same amplitude, these extrapolations for the three specific deflected positions of the cross-over point 37 will all cross each other and will do so at the axis 27.

The effect which results from this is the same as would be obtained if a single point source of electrons positioned at the virtual cross-over point 38 were to emit electrons, during different sequential intervals, with their mean directional axes divergent from the axis 27 in three discrete radial directions 120 degrees apart. Because of this, the final sharply focused image produced by the red, green and blue exciting beam electrons will "register" in the plane of the masking electrode, i. e., will impinge on the same point thereof, under similar deflection-field conditions. For example, in a dot-sequential system, a system in which the color switching frequency is very much higher than the highest scanning frequency, the three differently convergent "beams" will take turns in impinging on each picture element before the relatively slow scansion directs them to the next one. On the other hand, in a field sequential system, each "beam" will take its turn to scan all of the picture elements once before one of the other two beams begins to do the same. Nevertheless, under similar deflection field conditions, the different beams will all impinge on the same picture element(s).

The provision of sharp-edged, flat-topped switching voltages or currents can require substantial amounts of power where the color switching is at a high frequency.

One way to meet this problem is to accomplish the color switching deflection before the electrons reach their maximum velocities. To this end, the neck end of the conductive coating 19 may be shortened and reduced potentials may be applied to the elements which afford the electron optics employed to attain the first cross-over 37. Under such conditions, the electrons will reach their maximum velocities by post-acceleration in a region further along their way to the screen.

In the operation of the tube 10 the color switching rate employed depends on the rate of change in the color information, e. g., the repetition frequency with which signals representing different color picture intensities are time-division multiplexed. Obviously, the color switching voltages or currents must be synchronized with the sequentially occurring color components of the multiplexed video signal which in practice is applied to the gun 18 to modulate the current issuing from it.

What is claimed is:

1. A color television picture tube comprising: an evacuated envelope containing a screen having an instantaneous color-response characteristic to bombardment by electrons which is different for each of a number of different directions of convergence thereof upon the screen; an electron gun for projecting *a single beam of* electrons toward said screen with [their] *its* mean axis extending along a predetermined path in an initial portion thereof; and color switching means including as many individual deflection means as the number of said different convergent directions, each of the individual means being effective in a region near the end of said initial portion of said path to deflect *said single beam of* electrons [, which are moving therealong ,] in a respective one of at least three different predetermined outward radial directions with respect to said path each of which corresponds to a respective one of said directions of convergence.

2. A color television picture tube comprising: an evacuated envelope containing a directional polychromatic-emissive screen adapted to emit light of any one of a number of different colors in response to bombardment by electrons which impinge thereon in a corresponding one of an equal number of different convergent directions; a gun for projecting *a single beam of* electrons toward said screen with [their] *its* mean axis extending along a predetermined path in an initial portion thereof; electron optical means for causing electrons which diverge from said path in an intermediate portion thereof to converge upon said screen in a final portion thereof; and as many individual deflection means as said number of different colors, each of the deflection means being effective in said intermediate portion of said path to divert [the mean axis] *said single beam* of electrons in a respective one of at least three different predetermined outward radial directions, with respect to said path, each of which corresponds to a respective one of said different directions of convergence.

3. A picture tube comprising an evacuated envelope containing a directional screen having a plurality of picture-element areas, each including a plurality of sub-elementary fluorescent coatings, the directional screen being so arranged that at each picture-element area different ones of its sub-elementary coatings are selectively excited by beam electrons which converge upon said area in different radial directions; gun means for projecting *a single beam of* electrons toward said directional screen with [their] *its* mean axis extending along a predetermined path in an initial portion thereof; and direction-of-convergence control means including as many individual deflection means as the number of sub-elementary coatings in each picture element area, each of said deflection means being effective in a region near the end of said initial portion of said path to divert *said single* [electrons] *electron beam* in a respective one of at least three different predetermined outward radial directions, with respect to said path, each of which corresponds to a respective one of said directions of convergence.

4. A picture tube as in claim 3 in which said gun means has an electron cross-over point in said region near the end of the initial portion of said path.

5. A color television picture tube comprising an evacuated envelope containing a directional polychromatic-emissive screen having a plurality of picture-element areas and adapted to emit any one of three different colors from any of said areas in response to bombardment by electrons which impinge thereon in a corresponding one of three different convergent directions; gun means for projecting *a single beam of* electrons toward said screen with [their] *its* mean axis extending along a predetermined path in an initial portion thereof; and color switching means located in a region near the end of said path and including a separate deflection means for deflecting *said single beam of* electrons in a different predetermined outward radial direction, with respect to said path, for each of said directions of convergence.

6. A color television tube as in claim 5 in which each of said separate deflection means comprises an electrostatic deflection plate which faces the corresponding plates of the other two separate deflection means with its inside surface disposed at an angle of sixty degrees with respect to the inside surface of each of said two plates.

7. A color television picture tube as in claim 5 in which said gun means is adapted to produce a cross-over of electrons in said region.

8. A color television picture tube comprising: an evacuated envelope containing a directional polychromatic-emissive screen having a plurality of picture-element areas and adapted to emit light of any one of a number of different colors at any of said areas in response to bombardment by electrons which impinge thereon in a corresponding one of an equal number of different convergent directions; means for producing an electron optic having an object axis and an image axis and disposed on the electron-approach side of said screen for causing electrons which diverge from said object axis in moving through the optic toward the screen to converge toward said image axis at a point near the screen; gun means for projecting *a single beam of* electrons in a forward direction toward said optic along a path which coincides with an extension of said object axis in the opposite, rearward, direction; and color switching means located between the gun means and the means for producing an electron optic and including a separate deflection means for deflecting *said single beam of* electrons in each of at least three different predetermined outward radial directions with respect to said path, each of which outward directions corresponds to a respective one of said different directions of convergence.

9. A color television picture tube as in claim 8 and further comprising scansion-deflection means for effectively varying periodically and in two coordinates the angular direction of said image axis with respect to said object axis whereby under control of said switching means and said scansion-deflection means *the single beam of* electrons projected from said gun means at different times will have said different convergence directions for all of said picture-element areas.

References Cited in the file of this patent or the original patent

UNITED STATES PATENTS 2,227,135 Hollmann ---------- Dec. 31, 1940

FOREIGN PATENTS 866,065 France ---------- Mar. 31, 1941